(12) United States Patent
Clement

(10) Patent No.: US 7,145,425 B2  
(45) Date of Patent: *Dec. 5, 2006

(54) MAGNETIC SECUREMENT DEVICE MAGNETICALLY ATTACHED TO A SHEETROCK FASTENER

(76) Inventor: Joe Raymond Clement, 16218 Woodland La., Minnetonka, MN (US) 55345

( * ) Notice: Subject to any disclaimer, the term of this patent is extended or adjusted under 35 U.S.C. 154(b) by 0 days.

This patent is subject to a terminal disclaimer.

(21) Appl. No.: 11/032,161

(22) Filed: Jan. 7, 2005

(65) Prior Publication Data

US 2006/0152316 A1 Jul. 13, 2006

(51) Int. Cl.  
*H01F 7/20* (2006.01)

(52) U.S. Cl. .................................. 335/285; 335/302

(58) Field of Classification Search ........ 335/285–306; 294/65.5; 324/67  
See application file for complete search history.

(56) References Cited

U.S. PATENT DOCUMENTS 6,696,827 B1 * 2/2004 Fazekas et al. ............... 324/67  
6,747,536 B1 * 6/2004 Miller, Jr. .................... 335/285

OTHER PUBLICATIONS www.gaussboys.com (index) \Uses and Ideas \Redecorate Your Home This is an internet site. No date information is available.

* cited by examiner

*Primary Examiner*—Ramon M. Barrera

(57) ABSTRACT

A magnetic securement device that includes a high energy magnet and a securing member. The device attaches to sheetrock walls through magnetic attraction to sheetrock screws or nails. The device would support display objects by either squeezing them between the device and the wall, hanging them on the device, or hanging them on hooks affixed to the magnet. The magnet of the device is a lightweight neodymium magnet that provides great strength in a small package. These magnets are able to attach themselves to the head of a screw or nail and cling there with enough force to support light display objects attached thereto.

19 Claims, 3 Drawing Sheets

Vertical Cross Section of Second Embodiment

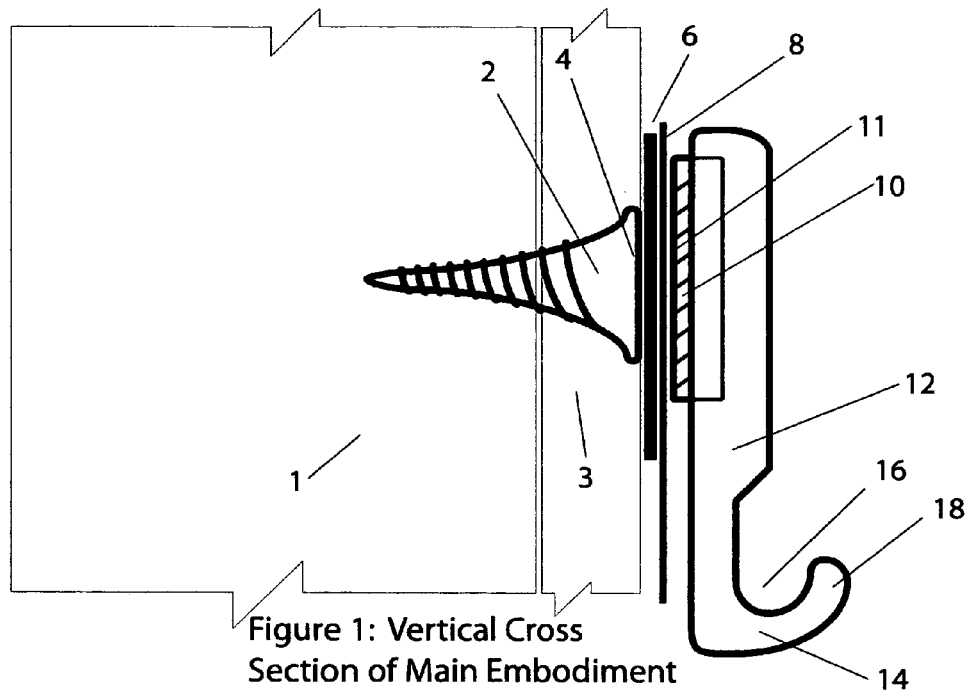
Figure 1: Vertical Cross Section of Main Embodiment
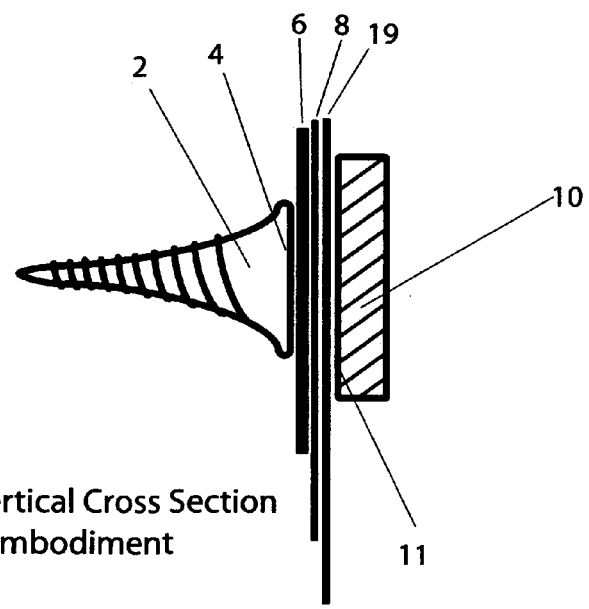
Figure 2: Vertical Cross Section of Second Embodiment

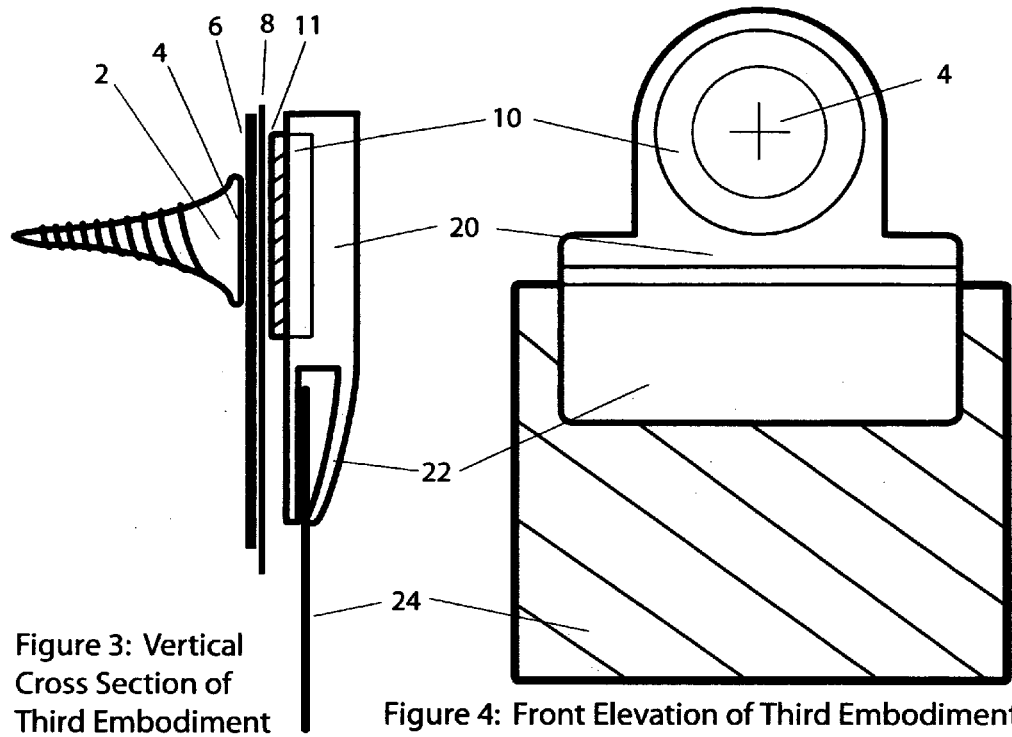
Figure 3: Vertical Cross Section of Third Embodiment
Figure 4: Front Elevation of Third Embodiment
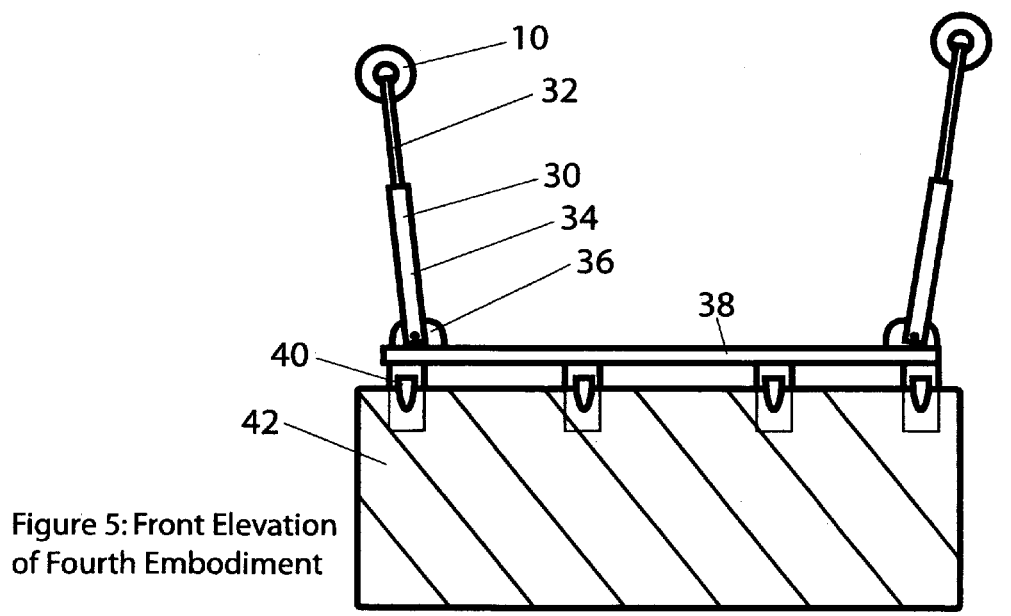
Figure 5: Front Elevation of Fourth Embodiment

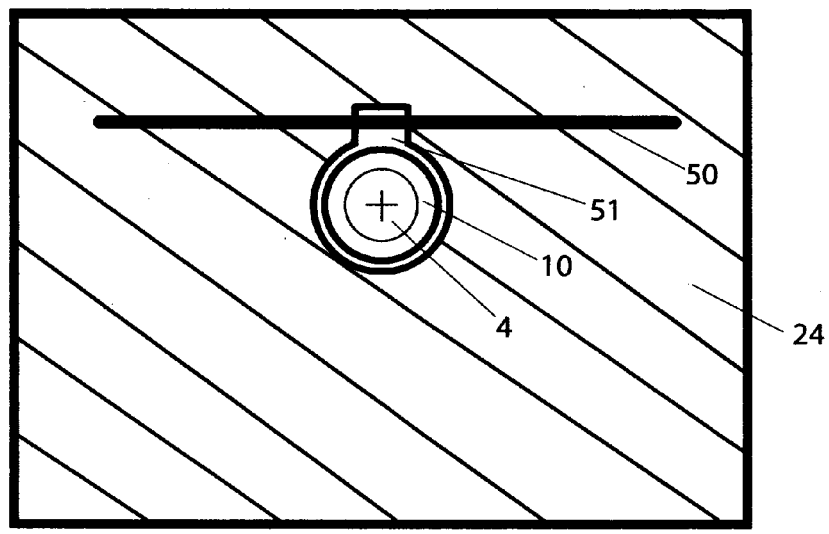
Figure 6: Front Elevation of Fifth Embodiment

MAGNETIC SECUREMENT DEVICE MAGNETICALLY ATTACHED TO A SHEETROCK FASTENER

BACKGROUND: FIELD OF INVENTION

This invention describes a magnetic securement device magnetically attached to an applied sheetrock fastener. Once in place, the magnetic securement device can support objects desired to be displayed on a wall.

BACKGROUND: DESCRIPTION OF PRIOR ART

There are many magnetic clips on the market today. Typically they consist of a low strength magnet affixed to a dip. The clip is usually made of steel although some are made of plastic. Very few examples of high power neodymium magnetic clips exist. The low strength magnetic clips are designed to hang on a substantial ferric surface such as a steel file cabinet or refrigerator. However, most interior walls of buildings are sheathed with sheetrock. This is the most common wall surface available for hanging display objects. The only available ferric objects near the surface of these walls are steel corner reinforcers and steel sheetrock fasteners.

The most common of these two is the steel fastener that exists in nearly all sheetrock walls just beneath the surface. The head of the fastener is generally quite small, a half inch or less in diameter. The fasteners are either steel screws or steel nails. They are usually covered with a thin layer of sheetrock compound and paint and thus cannot be seen. As a result of these fasteners being small, covered, and not visible, no magnetic clip has been designed utilize them. No securement device known today is able to attach to these small heads and cling there with enough strength to support a display object.

A common tool used to locate sheetrock fasteners is the magnetic stud finder. This device uses a magnet to locate undersurface steel objects and visually indicate their presence. These devices have no ability to attach themselves to the fasteners.

One web site does mention the possibility of a neodymium magnet attaching itself to a sheetrock fastener. The index to this website is www.gaussboys.com. Under their "Super Magnet Applications" is a subsection titled "Redecorate your home". In it the web site states, "Try using a couple of neodymium super magnets as stud finders when you are hanging pictures on a wall. The magnets will stick to the sheet rock nails on the studs and give you a great visual of what you have to work with while you make all of your pictures look balanced on the wall." This procedure realizes what others have done before with magnets, namely to merely locate nails in the wall. This text indicates no understanding of using the magnets to secure an independent display object to the nail and there support it. The magnets simply provide visual information for the locating of studs. This use of magnets simply follows the known art of locating sheetrock fasteners through magnetic detection. The authors here mention only the possibility of the magnets supporting themselves. Having a magnet simply support itself and having it support another object for display is an entirely different matter and one this is not foreseen or mentioned by this web site. This page of the site does not mention any combining of a neodymium magnet with a clip or display object.

One further evidence exists that the guassboy site does not intonate hanging independent objects on the magnets attached to the sheetrock fasteners. The gaussboy site is an emcommerce site organized to sell magnets and related goods. If the authors of this site had understood the possibility of hanging objects on the magnets, they certainly would have explicitly described such an assembly. Such an application could greatly boost the commercial sales of the site if this use was exploited.

No other combination of neodymium magnets attached to sheetrock fasteners is known in the public domain.

SUMMARY

The device described herein combines an applied sheetrock fastener with a neodymium magnet magnetically attached to the fastener. The attachment base of the magnet lies in a vertical position. The magnet can then secure an independent object by squeezing the object between the magnet and the wall, by hanging it directly on the magnet, or by attaching the object to a securing member affixed to the magnet. The securing member could be as small as a simple hook or a larger element such as an elongated clip or a horizontal bar with multiple small clips.

OBJECTS AND ADVANTAGES

Accordingly, several objects and advantages of the disclosed design follow.

The placement of the magnetic securement device is very straightforward. The sheetrock fastener is located by waving the magnet across the surface of the wall in descending arcs that reach about 26 inches horizontally and 2 inches vertically. This waving action reveals the location of the sheetrock fasteners as they attract the magnet as it passes near them. Since most wall studs are located 16 to 24 inches on center, the waving of the magnet in 26 inch horizontal passes will find one of the two possible studs located in the wall. Once the fastener is found, the device is simply attached at that location. With experience this procedure usually takes only a part of a minute to successfully conclude.

Placing the magnetic device is thus very simple. No tools, adhesives, drills, or wires are needed. Once the sheetrock fastener is located, the magnet of the device is simply centered on the sheetrock fastener and released. Removal is even simpler and faster. Simply lift the magnet from the sheetrock fastener. Since no holes were made for the application, no wall patching need accompany the removal of the device. No sticky residue is left on the wall as is common with tape and adhesive gums. This system is ideal for temporary Holiday ornament hanging as the easy on and off procedure suits this application well.

The magnetic device is very simple and inexpensive to manufacture. The retail price thus will be low enough for use in multiple applications. The device is made of simple and commonplace materials. A combination of a neodymium magnet and a plastic securing member comprises most of the embodiments of the device. The device is also lightweight and compact which will aid with shipping and display costs.

One of the permutations of the device is the combination of a sheetrock fastener with a plain neodymium magnet attached to it. Between these two items a sheet element is secured by squeezing. When this combination is used, an unusual and unforeseen result occurs. If it is desired to move the graphic sheet, the magnet need not be removed, the sheet repositioned, and the magnet replaced. Rather the sheet can be grasped and slowly pulled to its new location. The magnet slides across the face of the sheet so that the magnet retains its original position centered on the fastener. This same result occurs when multiple magnets hold a sheet to a wall. The sheet is grasped and moved and the multiple magnets all retain their original position relative to the fasteners. This is of great benefit as a location originally chosen to locate a graphic sheet is rarely the final position. Rather the final location of such sheets is often found by trial and error. This ability of the device to allow a repositioning of the sheet without removing the device is unknown in other sheetrock attachment applications.

The magnetic device can support up to nearly a pound of weight in some applications. This gives it the ability to secure calendars, posters, many types of ornaments, and a host of other display objects. The shape of the display object is preferentially planar so that the object will lie flat against the wall. This configuration is best suited for the device as objects lying against the wall exert only a vertical, downward force on the magnet. The magnet is most able to withstand a force from this direction.

Still further objects and advantages of the disclosed device will become apparent from consideration of the following figures and descriptions.

DRAWING DESCRIPTIONS

FIG. 1: Vertical Cross Section of Main Embodiment
FIG. 2: Vertical Cross Section of Second Embodiment
FIG. 3: Vertical Cross Section of Third Embodiment
FIG. 4: Front Elevation of Third Embodiment
FIG. 5: Front Elevation of Fourth Embodiment
FIG. 6: Front Elevation of Fifth Embodiment

DESCRIPTIONS: FIGS. 1 TO 5

FIG. 1 illustrates a vertical cross section of the main embodiment. A sheetrock screw 2 has a flat head 4 and lies imbedded in a piece of sheetrock 3 and a wall stud 1. A thin layer of hardened sheetrock compound 6 and paint 8 covers the flat head 4. A magnetic securement device 12 lies close to the flat head 4. The magnetic securement device 12 includes a magnet 10 with a flat base 11. The magnetic securement device 12 also includes a hook 18 with a recurve 14 that defines a void 16.

FIG. 2 illustrates a vertical cross section of the second embodiment. Graphic sheet 19 lies between magnet 10 and sheetrock screw 2.

FIG. 3 illustrates a vertical cross section of the third embodiment. The magnetic securement device 20 includes a clip 22 that grips a sheet element 24.

FIG. 4 illustrates a front elevation of the third embodiment with the same components as noted in FIG. 3.

FIG. 5 illustrates a front elevation of the fourth embodiment. Arm 30 includes inner rod 32 and outer rod 34 that is attached to connecting bar 38 at joint 36. A graphic sheet 42 lies within multiple clips 40 that are spaced along connecting bar 38.

FIG. 6 illustrates a front elevation of the fifth embodiment. A horizontal extending arm 50 and magnet 10 lie on the front surface of a graphic sheet element 24. A plastic attachment device 51 joins the magnet 10 to the extending arm 50.

OPERATION

FIG. 1. The magnetic securement device 12 is attached to the sheetrock screw 2 by manually placing the flat base 11 of the magnet 10 close enough to the flat head 4 for magnetic attraction to secure it. This is done by waving the magnetic securement device across the wall in sweeping arcs that slowly move up and down the wall until the tug of the sheetrock screw 2 is sensed. The magnetic attraction is then able to secure the magnetic securement device 12 there.

The magnet required to accomplish this attachment must be a very high energy magnet and fit within certain size perameters. The only magnet currently appropriate to this function is a neodymium magnet, preferably one with a Bh max over 35. A Bh max closer to 45 is even more ideal. A magnet of this strength is able to support not only itself to the sheetrock screw 2 but is also able to support a display object. No other magnet type is able to match the performance of the neodymium magnet. These magnets are coated with metal or epoxy to keep the magnetic material from oxidizing. The most common metal coating is nickel plating.

The size of the magnet 10 to optimize its supporting ability should be a little larger in diameter than the flat head 4. Any extra oversizing is largely wasted as the strength of the magnetic attraction is inversely proportional to the cube of the distance between the magnet 10 and the screw 2. The optimal width of the magnet 10 is approximately three fourths of an inch. The optimal thickness of the magnet is approximately one half of an inch due to the same factors. As extra thickness is added, the additional portion of the magnet 10 is located farther from the flat head 4 and thus not as effective. The prime shapes are those that concentrate the mass of the magnet 10 near the flat head 4. These shapes include disc, hemisphere, or cube.

The thickness of the sheetrock compound 6 and the paint 8 have a pronounced impact on the ability of the magnet 10 to adhere. Most sheetrock fasteners lie between two and ten hundredths of an inch beneath the wall surface. This distance is short enough to allow the magnet 10 to cling firmly to the wall.

After the magnetic securement device 12 is attached, a display object can be hung in the void 16 defined by the recurve 14 of the hook 18. The display object will then lie in a vertical position in a location down from the hook 18. The force exerted on the magnetic securement device 12 is a downward force that the magnetic attachment is most able to overcome.

FIG. 2. A magnet 10 attached to sheetrock screw 2 can secure a sheet element 19. The magnetic attraction between the magnet 10 and the sheetrock screw 2 squeezes the sheet element 19 and prevents it from slipping down. Multiple magnets 10 can be used in this same manner to support larger graphic sheets.

FIGS. 3 & 4. Magnetic securement device 20 includes a horizontally extended clip 22 that retains sheet element 24 by pinching it at more than one location.

FIG. 5. Magnets 10 are shown as they would be if attached to sheetrock fasteners located at different heights. The arm 30 is adjustable in length. An inner rod 32 can slide into outer rod 34 to accomplish this. Thus the connecting bar 38 can be kept level and the clips 40 attached thereto can support sheet element 42 in a horizontal position.

FIG. 6. Magnet 10 and extending arm 50 press against the graphic sheet element 24 and thus support it on the wall at multiple locations.

CONCLUSION, RAMIFICATIONS AND SCOPE OF INVENTION

From the above descriptions, it is evident that the invention detailed herein improves upon the current art of displaying objects on sheetrock walls. The ease and simplicity of magnetic securement has not been previously exploited.

Many minor variations to the above noted invention are possible. The flat base of the magnet could have a textured surface or minute teeth that would help the flat base grip the wall. A tac could be applied to the same surface to also increase the ability of the device to hold firm. The tac could be of the type that leaves no residue behind.

The magnet could be partially encased in a light steel jacket that could improve the holding ability of the magnet. This is possible as magnetic flux lines travel more easily through steel than through air.

The sheetrock fastener could be magnetized. This would increase the magnetic attraction of the two objects.

A hanging arm could have one end attached to the magnet and the other end attached to the securing member. The hanging arm could have a means for adjusting its length so that an object held in the securing member could hang at variable distances from the fastener.

The magnet or its plating could include a hook shape so display objects could be directly attached to them without the need of affixing a separate element.

These and many other permutations are possible. Therefore the scope of this invention should not be construed to be limited to the few example described herein, but by the appended claims and their legal equivalents.

I claim:

1. A magnetic securement device comprising:
   a) a permanent magnet including a substantially flat base;
   b) a fastener made of steel and including a flat head;
   c) a piece of sheetrock oriented vertically;
   d) a wall stud;
   e) said fastener attaching said piece of sheetrock to said wall stud;
   f) said fastener thinly covered with a hardened, opaque paste;
   g) said substantially flat base of said permanent magnet positioned parallel and adjacent to said flat head of said fastener;
   h) said permanent magnet magnetically attached to said fastener; and
   i) said permanent magnet including a securing member configured and arranged to support a structurally independent object,
      whereby the object is secured for display or support on a wall.

2. The device of claim 1 wherein:
   a) said permanent magnet including at least one other surface; and
   b) said securing member attached to said other surface.

3. The device of claim 2 wherein:
   a) said securing member is selected from the group consisting of clip, hook, confining passageway, adhesive pad, and part of a hook and loop system.

4. The device of claim 2:
   a) including two of the permanent magnets;
   b) including two of the fasteners;
   c) including two of the wall studs;
   d) including two arms;
   e) including a connecting bar;
   f) said wall studs standing adjacent and parallel to each another;
   g) said permanent magnets attached to different said fasteners;
   h) said fasteners attached to different said wall studs;
   i) each of said two arms including a basal end, a middle section, and a projecting end;
   j) the basal ends attached to the other surfaces of different said permanent magnets;
   k) each said projecting end terminating a predetermined distance away from and predominantly down from said permanent magnet that said arm is attached to;
   l) each said middle section constructed and arranged to provide variability of length;
   m) said connecting bar attached to the projecting ends of said two arms; and
   n) said connecting bar including said securing member,
      whereby the permanent magnets may be attached to fasteners having differing heights and said connecting bar be held horizontal through adjustment of the arms and a structurally independent object may be hung level.

5. The device of claim 2 comprising:
   a) a hanging arm;
   b) said hanging arm positioned between said other surface and said securing member;
   c) said hanging arm attached to said other surface and said securing member; and
   d) said hanging arm constructed and arranged to provide variability of length,
      whereby a structurally independent object may be hung at variable distances below the fastener.

6. The device of claim 3 wherein:
   a) said securing member has a width that extends horizontally and parallel to said piece of sheetrock; and
   b) said securing member constructed and arranged to provide securement at multiple locations,
      whereby a structurally independent object may be secured at multiple locations along the horizontal extension of the securing member.

7. The device of claim 3 wherein:
   a) said clip, said hook, and said confining passageway form a partially enclosed void; and
   b) the void substantially lies directly beneath said permanent magnet,
      whereby a structurally independent object may be hung in the void in a location substantially directly beneath the permanent magnet.

8. The device of claim 1 wherein:
   a) said permanent magnet is a neodymium magnet.

9. The device in claim 1 wherein:
   a) said substantially flat base including minute projections,
      whereby the permanent magnet has increased resistance to vertical sliding.

10. The device in claim 1 wherein:
    a) said substantially flat base including a tac coat,
       whereby the permanent magnet has increased resistance to vertical sliding.

11. The device in claim 1 wherein:
    a) said fastener is selected from the group consisting of a screw and a nail;
    b) said piece of sheetrock is comprised of gypsum;
    c) said flat head is covered with sheetrock compound; and
    d) said sheetrock compound is covered with paint.

12. The device of claim 1 wherein:
    a) said permanent magnet including at least one other surface; and
    b) said other surface of a predetermined shape to support a structurally independent object.

13. The device of claim 1 wherein:
    a) said permanent magnet including at least one other surface;
    b) said permanent magnet including two magnetic poles;
    c) one of the said two magnetic poles located on the substantially flat base;

d) the other of the said two magnetic poles located on said other surface; and
e) said other surface is said securing member,
   whereby a display object including a ferric surface or a magnet may be magnetically attached to the securing member.

14. The device of claim 1 wherein:
a) said permanent magnet is of a predetermined size, shape, and strength to squeeze and support a flat object between said flat head and said substantially flat base,
   whereby a graphic sheet or a flat tab supporting a display object is squeezed between the magnet and the fastener and thereby supported.

15. The device of claim 14 including:
a) said flat object; and
b) said flat object located between said flat head and said substantially flat base,
   whereby a graphic sheet or a flat tab supporting a display object is squeezed between the magnet and the fastener and thereby supported.

16. The device of claim 14 comprising:
a) an extending arm;
b) said permanent magnet including at least one other surface;
c) said extending arm attached to said other surface;
d) said extending arm including a segment lying in the same plane as said substantially flat base extended; and
e) said segment of said extending arm positioned a predetermined distance away from said permanent magnet,
   whereby a graphic sheet is further supported when squeezed between the segment of the extending arm and the sheetrock.

17. The device of claim 14 comprising:
a) a plurality of the permanent magnets;
b) a plurality of the fasteners; and
c) said permanent magnets magnetically attached to different said fasteners,
   whereby a larger graphic sheet may be squeezed between the magnets and the fasteners and thereby supported at several locations.

18. A magnetic securement device comprising:
a) a permanent magnet including a substantially flat base;
b) an applied wall sheathing to wall stud fastener;
c) the fastener made of steel and including a flat head;
d) said flat head covered with a hardened, opaque paste;
e) said substantially flat base of said permanent magnet positioned parallel and adjacent to said flat head of said fastener;
f) said permanent magnet magnetically attached to said fastener; and
g) said permanent magnet including a securing member configured and arranged to support a structurally independent object through mechanisms selected from the group consisting of squeezing the object between said flat head and said permanent magnet, hanging the object directly on said permanent magnet, and attaching the object to a securing member that is in turn attached to said permanent magnet.

19. A magnetic securement device and a display object comprising:
a) a permanent magnet including a substantially flat base;
b) a fastener made of steel and including a flat head;
c) a vertical piece of sheetrock;
d) a wall stud;
e) a display object;
f) said fastener attaching said vertical piece of sheetrock to said wall stud;
g) said substantially flat base of said permanent magnet positioned parallel and adjacent to said flat head of said fastener;
h) said permanent magnet magnetically attached to said fastener;
i) said permanent magnet including at least one other surface; and
j) said display object attached to said other surface,
   whereby the display object is secured on a wall.

* * * * *